(12) United States Patent
Harada (10) Patent No.: US 11,646,640 B2
(45) Date of Patent: May 9, 2023

(54) CONTROLLER FOR AC ROTATING ELECTRIC MACHINE

(71) Applicant: Mitsubishi Electric Corporation, Tokyo (JP)

(72) Inventor: Shingo Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/673,111

(22) Filed: Feb. 16, 2022

(65) Prior Publication Data

US 2022/0311311 A1  Sep. 29, 2022

(30) Foreign Application Priority Data

Mar. 29, 2021  (JP) .............................. JP2021-055450

(51) Int. Cl.
| | |
|---|---|
| *H02P 29/68* | (2016.01) |
| *H02K 11/215* | (2016.01) |
| *H02P 6/16* | (2016.01) |
| *H02P 29/024* | (2016.01) |
| *H02K 29/08* | (2006.01) |

(52) U.S. Cl.
CPC ............ *H02K 11/215* (2016.01); *H02K 29/08* (2013.01); *H02P 6/16* (2013.01); *H02P 29/024* (2013.01)

(58) Field of Classification Search
CPC .......... H02P 29/68; H02P 6/16; H02P 29/024; H02M 7/5395; H02K 11/215
See application file for complete search history.

(56) References Cited

U.S. PATENT DOCUMENTS

| | | | |
|---|---|---|---|
| 2017/0259846 A1* | 9/2017 | Koseki | ..................... H02P 29/68 |
| 2020/0153375 A1* | 5/2020 | Mori | ................... H02M 7/5395 |

FOREIGN PATENT DOCUMENTS

| | | |
|---|---|---|
| JP | 7-111708 A | 4/1995 |
| JP | 10-014300 A | 1/1998 |
| JP | 2010-011542 A | 1/2010 |

* cited by examiner

*Primary Examiner* — Cortez M Cook (74) *Attorney, Agent, or Firm* — Sughrue Mion, PLLC; Richard C. Turner (57) ABSTRACT

In a controller for an AC rotating electric machine, a failure-state determining circuitry determines a failure state of a magnetic-pole position sensor based on an output signal from the magnetic-pole position sensor. A modulation-ratio switching circuitry outputs a target value of a modulation ratio and also changes the target value to be output based on a result of the failure-state determining circuitry. The modulation-ratio switching circuitry sets, when the magnetic-pole position sensor is determined as being abnormal by the failure-state determining circuitry, the target value to be smaller than in a case in which the magnetic-pole sensor is determined as being normal by the failure-state determining circuitry.

14 Claims, 8 Drawing Sheets

CONTROLLER FOR AC ROTATING ELECTRIC MACHINE

BACKGROUND OF THE INVENTION

1. Field of the Invention

This disclosure relates to a controller for an AC rotating electric machine.

2. Description of the Related Art

In a related-art control mode switching device, the determination unit determines whether a sensor failure has occurred based on current command signals, current detection signals, and a velocity signal, and a switching unit. The switching unit switches a motor control mode from a vector control mode to a V/F control mode or a sensorless vector control mode in accordance with a sensor failure signal from the determination unit (see, for example, Japanese Patent Application Laid-Open H10-14300).

Overmodulation control is known as a method of improving a voltage utilization rate of a power converter that drives an AC rotating electric machine. However, the control mode switching device described in Japanese Patent Application Laid-Open H10-14300 does not use a modulation ratio. Thus, when the overmodulation control is performed in sensorless vector control, estimation performance for a rotation angle of a rotor degrades under effects of a harmonic wave superimposed on a voltage and a current. The degradation in estimation performance can result in difficulty in continuation of a stable operation of a motor when a sensor failure occurs.

SUMMARY OF THE INVENTION

This disclosure has been made to solve the problem described above, and has an object to provide a controller for an AC rotating electric machine, which enables an AC rotating electric machine to more reliably continue its operation when a failure of a magnetic-pole position sensor occurs.

According to at least one embodiment of this disclosure, there is provided a controller for an AC rotating electric machine, the controller including: a magnetic-pole position detecting circuitry configured to detect a magnetic-pole position of a rotor based on an electric signal to be output in accordance with a rotation angle of the rotor; a magnetic-pole position estimating circuitry configured to estimate the magnetic-pole position of the rotor independently of the output signal from the magnetic-pole position sensor; a failure-state determining circuitry configured to determine a failure state of the magnetic-pole position sensor based on the output signal from the magnetic-pole position sensor, a magnetic-pole position estimated by the magnetic-pole position estimating circuitry based on the output signal from the failure-state determining circuitry; a rotation-information switching circuitry configured to output, when the magnetic-pole position sensor is normal, a magnetic-pole position detected by the magnetic-pole position detecting circuitry, and to output, when the magnetic-pole position sensor is abnormal, a magnetic-pole position estimated by the magnetic-pole position estimating circuitry, based on the output signal from the failure-state determining circuitry: a modulation-ratio switching circuitry configured to output a target value of a modulation ratio, and to change the target value to be output based on a result of the determination by the failure-state determining circuitry; a current command value calculating circuitry configured to calculate a current command value based on the target value; a voltage command value calculating circuitry configured to calculate a voltage command value based on the current command value and the magnetic-pole position output from the rotation-information switching circuitry; and a switching control circuitry configured to turn on and off a plurality of switching elements formed in an inverter based on the voltage command value, wherein the modulation-ratio switching circuitry is configured to set, when the magnetic-pole position sensor is determined as being abnormal by the failure-state determining circuitry, the target value to be smaller than in a case in which the magnetic-pole sensor is determined as being normal.

According to the controller for an AC rotating electric machine of this disclosure, the AC rotating electric machine can reliably continue its operation when a failure of the magnetic-pole position sensor occurs.

DESCRIPTION OF THE EMBODIMENTS

Now, embodiments of this disclosure are described with reference to the drawings.

First Embodiment

Figure 1:
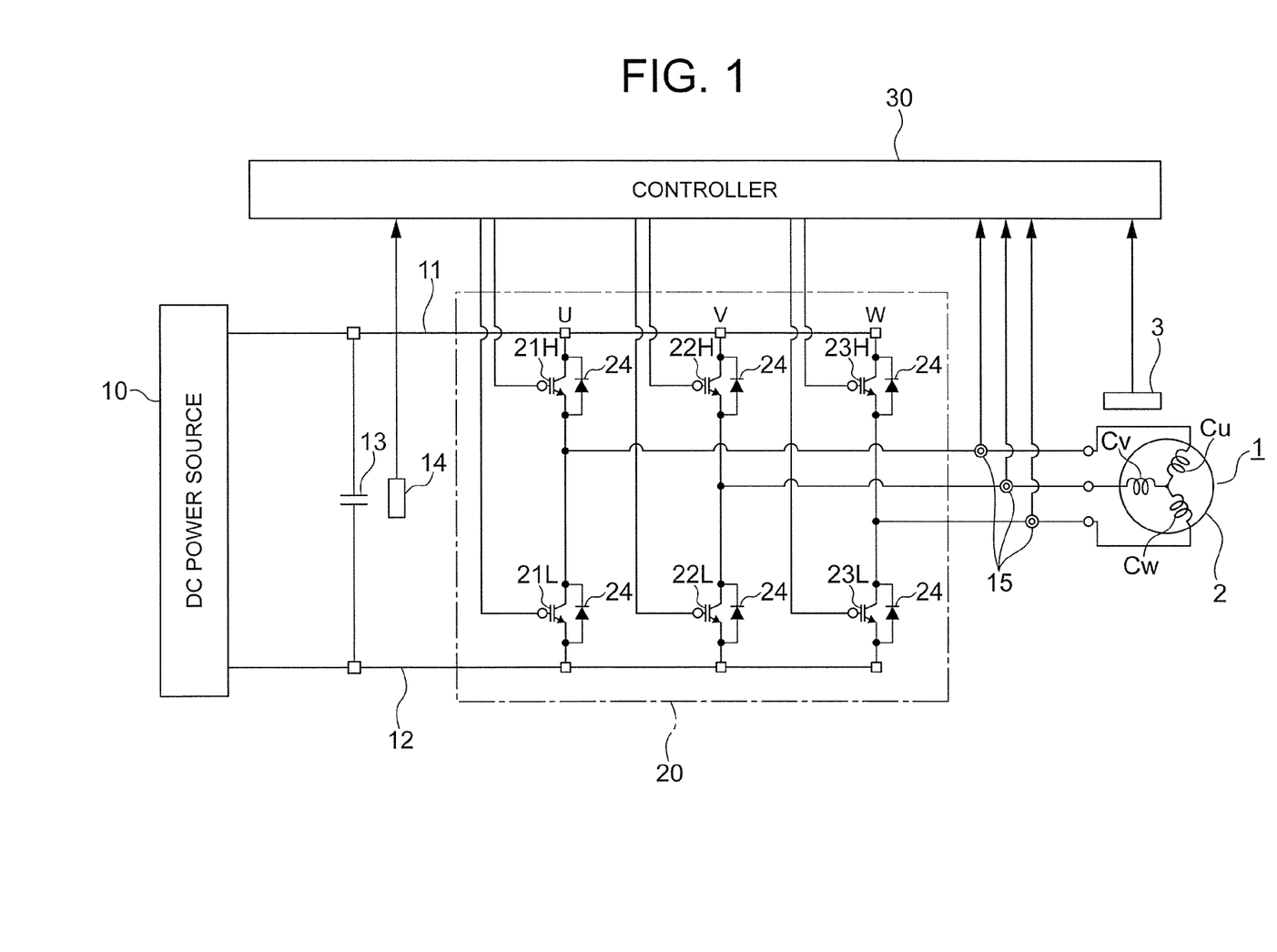
FIG. 1 is a schematic circuit diagram of an AC rotating electric machine and a controller therefor according to a first embodiment.

FIG. 1 is a schematic circuit diagram of an AC rotating electric machine and a controller therefor according to a first embodiment. An AC rotating electric machine 1 includes a stator, a rotor 2, and a magnetic-pole position sensor 3.

The stator includes windings of a plurality of phases. The stator in the first embodiment includes a U-phase winding Cu, a V-phase winding Cv, and a W-phase winding Cw. The U-phase winding Cu, the V-phase winding Cv, and the W-phase winding Cw are connected in a star or delta configuration. The rotor 2 rotates relative to the stator. Further, the rotor 2 includes a plurality of permanent magnets (not shown). The AC rotating electric machine 1 in the first embodiment is a permanent-magnet synchronous rotating electric machine.

The magnetic-pole position sensor 3 outputs an electric signal in accordance with a rotation angle of the rotor 2. For example, as the magnetic-pole position sensor 3, a Hall element, an encoder, or a resolver is used.

As a DC power source 10, a chargeable and dischargeable electricity storage device, for example, a lithium ion battery, a nickel hydrogen battery, or an electric double-layer capacitor is used. A DC-DC converter may be provided to the DC power source 10. The DC-DC converter is a DC power converter that boosts and bucks a DC voltage.

A positive-electrode wire 11 and a negative-electrode wire 12 are connected to the DC power source 10. A smoothing capacitor 13 is connected to and located between the positive-electrode wire 11 and the negative-electrode wire 12.

An inverter 20, which is a power converter, is provided between a set of the U-phase winding Cu, the V-phase winding Cv, and the W-phase winding Cw and the DC power source 10. A power supply voltage sensor 14 is connected to and located between the positive-electrode wire 11 and the negative-electrode wire 12. The power supply voltage sensor 14 detects a power supply voltage supplied from the DC power source 10 to the inverter 20.

The inverter 20 includes a plurality of switching elements and a plurality of diodes 24. The plurality of switching elements include a first positive-electrode switching element 21H, a first negative-electrode switching element 21L, a second positive-electrode switching element 22H, a second negative-electrode switching element 22L, a third positive-electrode switching element 23H, and a third negative-electrode switching element 23L.

Collector terminals of the first positive-electrode switching element 21H, the second positive-electrode switching element 22H, and the third positive-electrode switching element 23H are connected to the positive-electrode wire 11. Emitter terminals of the first negative-electrode switching element 21L, the second negative-electrode switching element 22L, and the third negative-electrode switching element 23L are connected to the negative-electrode wire 12.

The first positive-electrode switching element 21H and the first negative-electrode switching element 21L are connected in series. An emitter terminal of the first positive-electrode switching element 21H is connected to a collector terminal of the first negative-electrode switching element 21L.

The second positive-electrode switching element 22H and the second negative-electrode switching element 22L are connected in series. An emitter terminal of the second positive-electrode switching element 22H is connected to a collector terminal of the second negative-electrode switching element 22L.

The third positive-electrode switching element 23H and the third negative-electrode switching element 23L are connected in series. An emitter terminal of the third positive-electrode switching element 23H is connected to a collector terminal of the third negative-electrode switching element 23L.

A connection point between the first positive-electrode switching element 21H and the first negative-electrode switching element 21L is connected to the U-phase winding Cu. A connection point between the second positive-electrode switching element 22H and the second negative-electrode switching element 22L is connected to the V-phase winding Cv. A connection point between the third positive-electrode switching element 23H and the third negative-electrode switching element 23L is connected to the W-phase winding Cw.

An insulated gate bipolar transistor (IGBT) is used as each of the switching elements. Each of the diodes 24 is connected in antiparallel to a corresponding one of the switching elements.

A metal oxide semiconductor field effect transistor (MOSFET) having functions of the diode connected in antiparallel may be used as each of the switching elements.

A gate terminal of each of the switching elements is connected to a controller 30. This connection allows each of the switching elements to be turned on and off in accordance with a control signal output from the controller 30.

A plurality of current sensors 15 are provided between the inverter 20 and the AC rotating electric machine 1. Each of the current sensors 15 outputs an electric signal in accordance with a current flowing through a corresponding one of the U-phase winding Cu, the V-phase winding Cv, and the W-phase winding Cw.

In FIG. 1, each of the current sensors 15 is provided to an electric wire that connects a corresponding one of the windings and the inverter 20. However, each of the current sensors 15 may be provided in a corresponding series circuit in the inverter 20.

The output signal from the magnetic-pole position sensor 3, an output signal from the power supply voltage sensor 14, and the output signals from the plurality of current sensors 15 are input to the controller 30.

Figure 2:
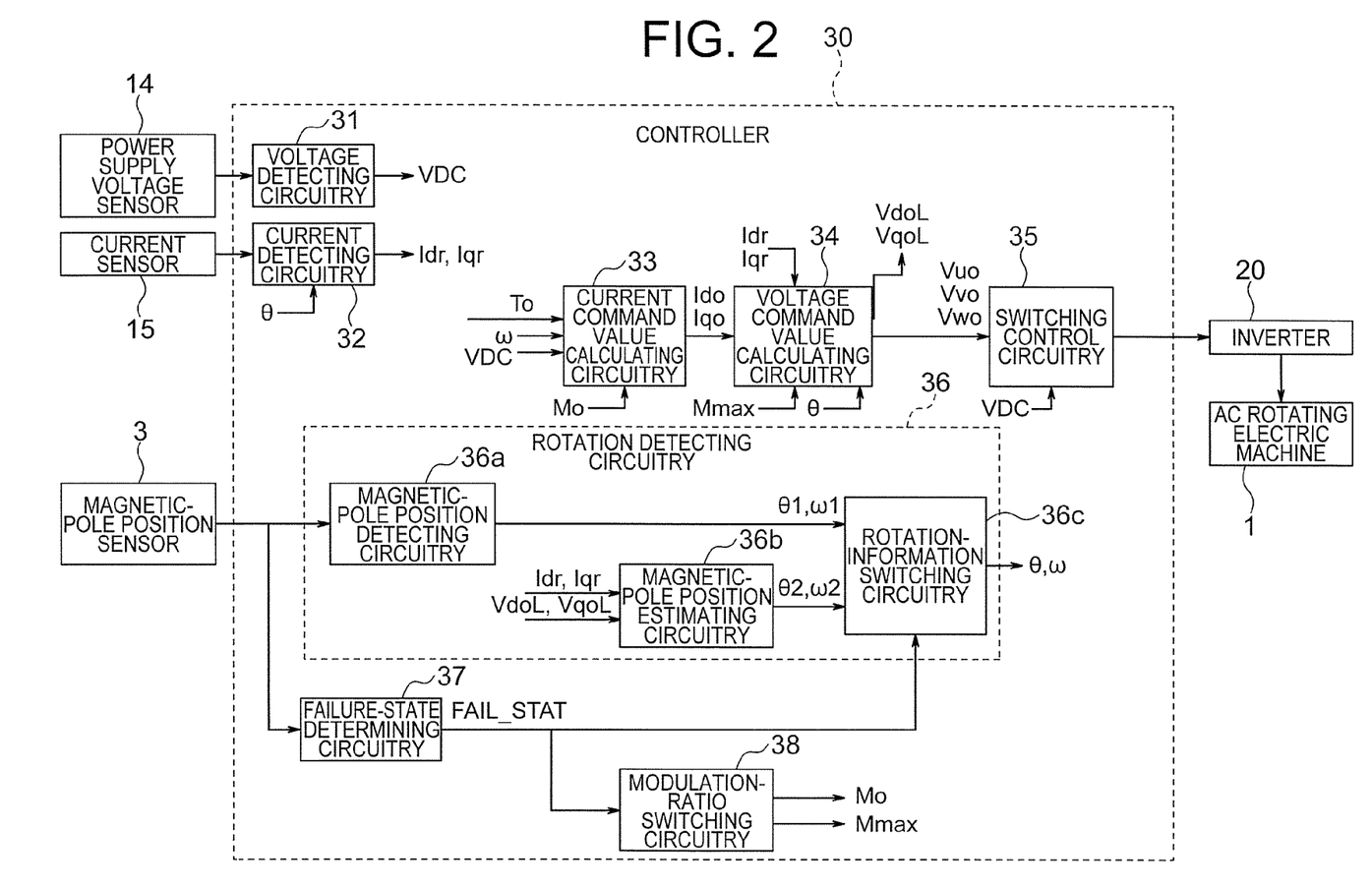
FIG. 2 is a block diagram of the controller illustrated in FIG. 1.

FIG. 2 is a block diagram of the controller 30 illustrated in FIG. 1. The controller 30 controls the AC rotating electric machine 1 through the inverter 20. Further, the controller 30 includes, as function blocks, a voltage detecting circuitry 31, a current detecting circuitry 32, a current command value calculating circuitry 33, a voltage command value calculating circuitry 34, a switching control circuitry 35, a rotation detecting circuitry 36, a failure-state determining circuitry 37, and a modulation-ratio switching circuitry 38.

The voltage detecting circuitry 31 detects a power supply voltage VDC supplied from the DC power source 10 to the inverter 20 based on the output signal from the power supply voltage sensor 14.

The current detecting circuitry 32 detects a detection value Iur (also referred to as "current detection value Iur") of the current flowing through the U-phase winding Cu, a detection value Ivr (also referred to as "current detection value Ivr") of the current flowing through the V-phase winding Cv, and a detection value Iwr (also referred to as "current detection value Iwr") of the current flowing through the W-phase winding Cw based on the output signals from the plurality of current sensors 15. In FIG. 2, only one current sensor 15 is illustrated for simplicity.

The currents may also be detected and calculated in the following manner. Currents flowing through two of the U-phase winding Cu, the V-phase winding Cv, and the W-phase winding Cw are detected by two current sensors 15, and a current flowing through the other one of the windings is detected based on the detection values obtained by the two current sensors 15.

For example, when the current detection value Ivr and the current detection value Iwr are detected by two current sensors 15, the detection value Iur of the current flowing through the U-phase winding Cu may be calculated by Iur=−Ivr−Iwr.

The current detecting circuitry 32 converts the current detection values Iur, Ivr, and Iwr of three phases into a d-axis current detection value Idr and a q-axis current detection value Iqr in a rotating coordinate system having a "d" axis and a "q" axis.

The "d" axis of the rotating coordinate system is defined as lying in a direction of a detected magnetic-pole position θ. The "q" axis of the rotating coordinate system is defined as lying in a direction advanced by 90 degrees in electrical angle from the "d" axis. The rotating coordinate system rotates in synchronization with rotation of the magnetic-pole position of the rotor 2.

More specifically, the current detecting circuitry 32 converts the current detection values Iur, Ivr, and Iwr of three phases into the d-axis current detection value Idr and the q-axis current detection value Iqr through three-phase to two-phase conversion and rotating coordinate transformation based on the magnetic-pole position θ.

The current command value calculating circuitry 33 calculates a plurality of current command values by a calculation method described later. In this embodiment, the current command value calculating circuitry 33 calculates a d-axis current command value Ido and a q-axis current command value Iqo as the plurality of current command values.

The voltage command value calculating circuitry 34 calculates a plurality of voltage command values based on the d-axis current detection value Idr and the q-axis current detection value Iqr that have been obtained by the current detection circuitry 32 and the d-axis current command value Ido and the q-axis current command value Iqo that have been calculated by the current command value calculating circuitry 33. In this embodiment, the voltage command value calculating circuitry 34 calculates, as the plurality of voltage command values, a U-phase voltage command value Vuo, a V-phase voltage command value Vvo, and a W-phase voltage command value Vwo.

Further, the voltage command value calculating circuitry 34 performs current feedback control, for example, proportional-integral (PI) control. The current feedback control changes the d-axis voltage command value Vdo and the q-axis voltage command value Vqo so that the d-axis current detection value Idr becomes closer to the d-axis current command value Ido and the q-axis current detection value Iqr becomes closer to the q-axis current command value Iqo.

Feedforward control may be additionally performed so as to prevent interference between the d-axis current and the q-axis current.

Alternatively, the voltage command value calculating circuitry 34 may perform only the feedforward control. In this case, the plurality of current sensors 15 and the current detecting circuitry 32 are eliminated.

Figure 3:
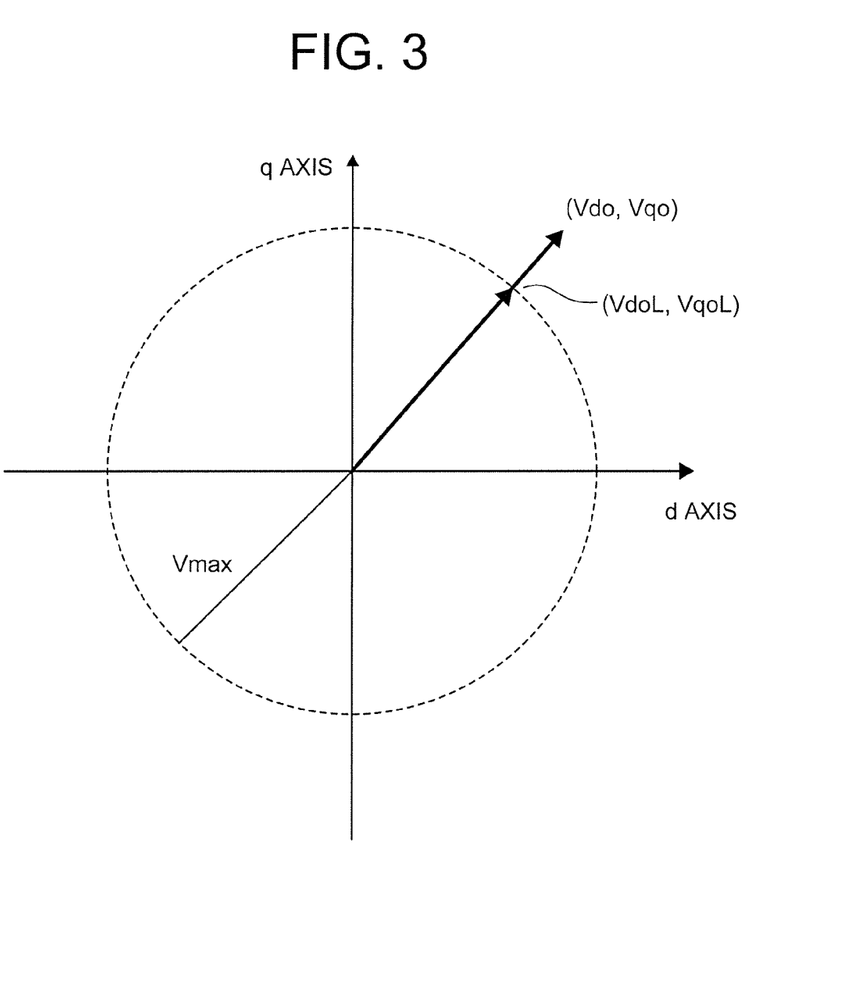
FIG. 3 is a graph for showing voltage limiting processing performed in a voltage command value calculating circuitry illustrated in FIG. 2.

Further, as shown in FIG. 3, the voltage command value calculating circuitry 34 limits the d-axis voltage command value Vdo and the q-axis voltage command value Vqo based on a maximum value Mmax of a modulation ratio, and outputs a limited d-axis voltage command value VdoL and a limited q-axis voltage command value VqoL.

When a magnitude of a vector composed of the d-axis voltage command value Vdo and the q-axis voltage command value Vqo in dq coordinates is larger than a voltage limit value Vmax, the magnitude of the vector is limited to the voltage limit value Vmax. In this case, the vector is changed only in magnitude, and not in direction. The voltage limit value Vmax is calculated by the following expression.

$$V_{max} = \frac{VDC}{2}\sqrt{\frac{3}{2}} M_{max}$$

The voltage limit value Vmax is a magnitude of a voltage vector in the dq coordinates, which is converted from the maximum value Mmax of the modulation ratio. Limiting the d-axis voltage command value and the q-axis voltage command value with use of the voltage limit value Vmax enables an actual modulation ratio to be limited to the maximum value Mmax of the modulation ratio or smaller.

Further, the voltage command value calculating circuitry 34 performs fixed coordinate transformation and two-phase to three-phase conversion on the limited d-axis voltage command value VdoL and the limited q-axis voltage command value VqoL based on the magnetic-pole position θ to calculate a U-phase voltage command value Vuo, a V-phase voltage command value Vvo, and a W-phase voltage command value Vwo.

A zero-phase component, for example, a third harmonic wave may be added to the voltage command values of three phases. When a zero-phase component is superimposed on the voltage command values of three phases, a magnitude of a harmonic component increases as the modulation ratio increases even within a range of overmodulation control. Thus, the harmonic component can be reduced as the modulation ratio decreases.

The switching control circuitry 35 performs switching control based on the voltage command values Vuo, Vvo, and Vwo of three phases output from the voltage command value calculating circuitry 34 to apply voltages to the U-phase winding Cu, the V-phase winding Cv, and the W-phase winding Cw. The switching control uses pulse width modulation (PWM) control to turn on and off the plurality of switching elements of the inverter 20.

Further, the switching control circuitry 35 compares the voltage command values Vuo, Vvo, and Vwo of three phases with a carrier wave to generate a plurality of switching signals. Each of the switching signals turns on and off a corresponding one of the switching elements.

The carrier wave is defined as a triangle wave oscillating about zero with an amplitude of one half of an amplitude of the power supply voltage VDC at a carrier frequency. When the voltage command values Vuo, Vvo, Vwo of three phases become larger than the carrier wave, the switching control circuitry 35 turns on the switching signals. When the voltage command values Vuo, Vvo, Vwo of three phases become smaller than the carrier wave, the switching control circuitry 35 turns off the switching signals.

The switching signals are directly transmitted to the first positive-electrode switching element 21H, the second positive-electrode switching element 22H, and the third positive-electrode switching element 23H. Signals obtained by inverting the switching signals are transmitted to the first negative-electrode switching element 21L, the second negative-electrode switching element 22L, and the third negative-electrode switching element 23L.

Figure 4:
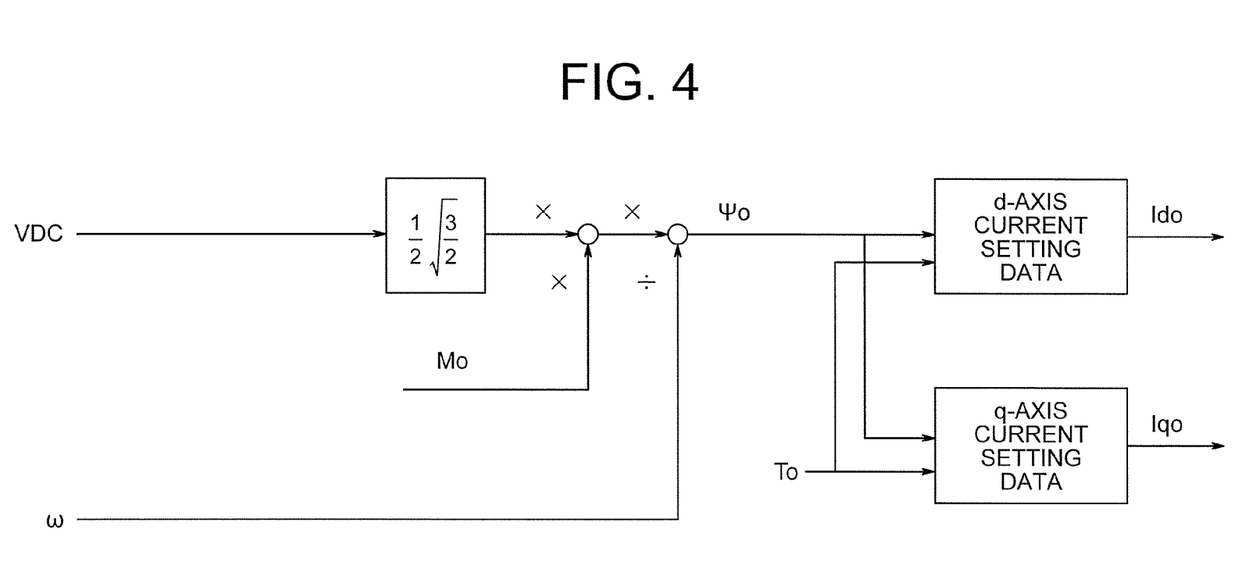
FIG. 4 is an explanatory diagram for illustrating a method of calculating a d-axis current command value and a q-axis current command value, which is used by a current command value calculating circuitry illustrated in FIG. 2.

FIG. 4 is an explanatory diagram for illustrating a method of calculating the d-axis current command value Ido and the q-axis current command value Iqo, which is used by the current command value calculating circuitry 33 illustrated in FIG. 2.

The current command value calculating circuitry 33 uses a target value Mo of the modulation ratio, which has been calculated in the modulation-ratio switching circuitry 38, to calculate the d-axis current command value Ido and the q-axis current command value Iqo. The modulation ratio is a ratio of an amplitude of a fundamental wave component of the voltage applied to the U-phase winding Cu, the V-phase winding Cv, and the W-phase winding Cw to one half of the amplitude of the power supply voltage VDC.

The current command value calculating circuitry 33 calculates an interlinkage magnetic flux command value ψo based on the target value Mo of the modulation ratio. The interlinkage magnetic flux command value ψo is a command value for an interlinkage magnetic flux of an armature. The current command value calculating circuitry 33 multiplies the target value Mo of the modulation ratio by the power supply voltage VDC and then divides the result of multiplication by a rotational angular velocity ω to calculate the interlinkage magnetic flux command value ψ.

More specifically, the current command value calculating circuitry 33 calculates the interlinkage magnetic flux command value ψo as illustrated in FIG. 4 and expressed by the following expression.

$$\Psi_0 = M_0 \frac{1}{2}\sqrt{\frac{3}{2}} \frac{VDC}{\omega}$$

The interlinkage magnetic flux command value ψo may be corrected through feedback control so as to reduce a difference between the target value Mo of the modulation ratio and an actual modulation ratio Mr. The actual modulation ratio Mr is calculated, for example, based on the limited d-axis voltage command value VdoL and the limited q-axis voltage command value VqoL.

The current command value calculating circuitry 33 calculates the d-axis current command value Ido and the q-axis current command value Iqo based on the interlinkage magnetic flux command value ψo and a torque command value To.

In the current command value calculating circuitry 33, d-axis current setting data and q-axis current setting data are set in advance. The d-axis current setting data indicates a relationship between a combination of the interlinkage magnetic flux command value ψo and the torque command value To and the d-axis current command value Ido. The q-axis current setting data indicates a relationship between a combination of the interlinkage magnetic flux command value ψo and the torque command value To and the q-axis current command value Iqo.

The current command value calculating circuitry 33 refers to the d-axis current setting data to calculate the d-axis current command value Ido, which is commonly used in this embodiment and corresponds to a combination of the interlinkage magnetic flux command value ψo and the torque command value To. Similarly, the current command value calculating circuitry 33 refers to the q-axis current setting data to calculate the q-axis current command value Iqo, which is commonly used in this embodiment and corresponds to a combination of the interlinkage magnetic flux command value ψo and the torque command value To.

The d-axis current setting data and the q-axis current setting data are calculated based on the target value Mo of the modulation ratio. Thus, the actual modulation ratio approximately matches the target value Mo of the modulation ratio. Accordingly, the d-axis current command value Ido and the q-axis current command value Iqo are calculated such that the actual modulation ratio is reduced when the target value Mo of the modulation ratio is reduced.

The torque command value To may be computed in the controller 30 or transmitted from an external device.

The rotation detecting circuitry 36 detects a rotation angle of the rotor 2 in electrical angle, that is, a magnetic-pole position θ1, and an electrical angular velocity of the rotor 2, that is, a rotational angular velocity ω1, based on the output signal from the magnetic-pole position sensor 3. Further, the rotation detecting circuitry 36 estimates a magnetic-pole position θ2 and a rotational angular velocity ω2 based on the d-axis current detection value Idr, the q-axis current detection value Iqr, the limited d-axis voltage command value VdoL, and the limited q-axis voltage command value VqoL.

The rotation detecting circuitry 36 switches the magnetic-pole position θ and the rotational angular velocity ω to be output between θ1 and ω1 used at a time of vector control and θ2 and ω2 used at a time of sensorless vector control.

As illustrated in FIG. 2, the rotation detecting circuitry 36 includes, as function blocks, a magnetic-pole position detecting circuitry 36a, a magnetic-pole position estimating circuitry 36b, and a rotation-information switching circuitry 36c as function blocks.

The magnetic-pole position detecting circuitry 36a detects the magnetic-pole position θ1 in electrical angle and the rotational angular velocity ω1 of the rotor 2 based on the output signal from the magnetic-pole position sensor 3, and outputs the thus detected magnetic-pole position θ1 and rotational angular velocity ω1. In this embodiment, a direction of the magnetic-pole position θ1 is set toward the N pole of each of the permanent magnets of the rotor 2.

The magnetic-pole position θ1 may be input to a phase locked loop (PLL) implemented in software, and the rotational angular velocity ω1 may be input to an integrator as an output value from a control device.

The magnetic-pole position estimating circuitry 36b estimates the magnetic-pole position θ2 and the rotational angular velocity ω2 by using a publicly known estimation method without using the output signal from the magnetic-pole position sensor 3 at a time of the sensorless vector control. For example, in a case of angle estimation using an adaptive observer, the d-axis current detection value Idr, the q-axis current detection value Iqr, the d-axis voltage command value Vdo, and the q-axis voltage command value Vqo are input to the adaptive observer. Then, the magnetic-pole position θ2 and the rotational angular velocity ω2 are output from the adaptive observer. The estimation method is a publicly known technology, and thus a detailed description thereof is herein omitted.

The estimation with the adaptive observer uses the d-axis current detection value Idr and the q-axis current detection value Iqr. When the overmodulation control is performed, an output voltage may contain harmonic components generated by the overmodulation control. Along with the generation of the harmonic components, estimation values of the magnetic-pole position θ and the rotational angular velocity ω may be affected by harmonic components of the d-axis current detection value Idr and the q-axis current detection value Iqr. As a result, the estimation values of the magnetic-pole position θ and the rotational angular velocity co may become oscillatory and diverge.

When it is determined, based on an output signal from the failure-state determining circuitry 37, that the magnetic-pole position sensor 3 is normal, the rotation-information switching circuitry 36c outputs rotation information used for vector control. More specifically, when a failure-state signal FAIL_STAT, which is described later, is 0, the rotation-information switching circuitry 36c outputs the magnetic-pole position θ1 and the rotational angular velocity ω1, which have been detected by the magnetic-pole position detecting circuitry 36a, as final magnetic-pole position θ and rotational angle velocity ω.

Meanwhile, when it is determined, based on the output signal from the failure-state determining circuitry 37, that a failure of the magnetic-pole position sensor 3 has occurred or may have occurred, the rotation-information switching circuitry 36c outputs different rotation information for the sensorless vector control. More specifically, when the failure-state signal FAIL_STAT, which is described later, is not 0, the rotation-information switching circuitry 36c outputs the magnetic-pole position θ2 and the rotational angular velocity ω2, which have been estimated by the magnetic-pole position estimating circuitry 36b, as the final magnetic-pole position θ and rotational angular velocity ω.

The operations of the rotation-information switching circuitry 36c are summarized as follows.
1) When FAIL_STAT is 0, the rotation-information switching circuitry 36c outputs θ1 as θ and ω1 as ω for the vector control.
2) When FAIL_STAT is not 0, the rotation-information switching circuitry 36c outputs θ2 as θ and ω2 as ω for the sensorless vector control.

The failure-state determining circuitry 37 acquires the output signal from the magnetic-pole position sensor 3. The failure-state determining circuitry 37 determines a failure state of the magnetic-pole position sensor 3 based on the output signal from the magnetic-pole position sensor 3. The failure-state determining circuitry 37 outputs the failure-state signal FAIL_STAT as a result of determination of the failure state.

The failure-state signal FAIL_STAT indicates one of a normal state, a faulty state, and an intermediate state of the magnetic-pole position sensor 3. The intermediate state is a state in which it has not been definitively determined whether the magnetic-pole position sensor 3 is in the normal state or the faulty state.

When the result of determination of the magnetic-pole position sensor 3 is "NORMAL" and the output signal from the magnetic-pole position sensor 3 is normal, the failure-state determining circuitry 37 outputs the failure-state signal FAIL_STAT of 0. When the result of determination of the magnetic-pole position sensor 3 is "NORMAL" and the output signal from the magnetic-pole position sensor 3 is abnormal, the failure-state determining circuitry 37 outputs the failure-state signal FAIL_STAT of 1.

When the result of determination of the magnetic-pole position sensor 3 indicates that a failure of the magnetic-pole position sensor 3 has occurred, and the output signal from the magnetic-pole position sensor 3 is abnormal, the failure-state determining circuitry 37 outputs the failure-state signal FAIL_STAT of 2. When the result of determination of the magnetic-pole position sensor 3 indicates that a failure of the magnetic-pole position sensor 3 has occurred, and the output signal from the magnetic-pole position sensor 3 is normal, the failure-state determining circuitry 37 outputs the failure-state signal FAIL_STAT of 3.

The conditions of the failure-state signal FAIL_STAT are summarized as follows.
1) Definitively determined normality: when the result of determination is "NORMAL" and the output signal from the magnetic-pole position sensor 3 is normal, FAIL_STAT is 0.
2) Undefinitively determined failure: when the result of determination is "NORMAL" and the output signal from the magnetic-pole position sensor 3 is abnormal, FAIL_STAT is 1.
3) Definitively determined failure: when the result of determination is "FAULTY" and the output signal from the magnetic-pole position sensor 3 is abnormal, FAIL_STAT is 2.
4) Undefinitively determined normality: when the result of determination is "FAULTY" and the output signal from the magnetic-pole position sensor 3 is normal, FAIL_STAT is 3.

Among four values of the failure-state signal FAIL_STAT, the failure-state signals FAIL_STAT of 1 and 3 indicate the intermediate state.

The failure-state determining circuitry 37 includes a failure determination counter and a normal determination counter. When the result of determination of the magnetic-pole position sensor 3 is "NORMAL" but the output signal from the magnetic-pole position sensor 3 is abnormal, an abnormality count value, which is used by the failure determination counter, is incremented. When the output signal from the magnetic-pole position sensor 3 is not abnormal, the abnormality count value is decremented.

An initial value and a lower limit value of the abnormality count value are set to 0. When the abnormality count value reaches a preset failure definitive determination value, the failure-state determining circuitry 37 definitively determines that a failure of the magnetic-pole position sensor 3 has occurred.

When the result of determination of the magnetic-pole position sensor 3 indicates that a failure of the magnetic-pole position sensor 3 has occurred, but the output signal from the magnetic-pole position sensor 3 is normal, a normality count value, which is used by the normal determination counter, is incremented. When the output signal from the magnetic-pole position sensor 3 is not normal, the normality count value is decremented.

An initial value and a lower limit value of the normality count value are set to 0. When the normality count value reaches a preset normality definitive determination value, the failure-state determining circuitry 37 definitively determines that the magnetic-pole position sensor 3 is in the normal state. Various publicly known methods can be used as a method of determining whether the output signal from the magnetic-pole position sensor 3 is abnormal, and thus the method is not described herein in detail.

The modulation-ratio switching circuitry 38 outputs the following values as the target value Mo of the modulation ratio and the maximum value Mmax of the modulation ratio based on the failure-state signal FAIL_STAT.
1) When the failure-state signal FAIL_STAT is 0 or 1, the modulation-ratio switching circuitry 38 outputs the target value Mo of 1.20 and the maximum value Mmax of 1.27.
2) When the failure-state signal FAIL_STAT is 2 or 3, the modulation-ratio switching circuitry 38 outputs the target value Mo of 1.05 and the maximum value Mmax of 1.15.

In this embodiment, a zero-phase component, for example, a third harmonic wave is added to the voltage command values Vuo, Vvo, and Vwo of three phases. Thus, when the modulation ratio is equal to or larger than 1.15, the output voltage may contain harmonic waves generated by the overmodulation control.

When the result of determination of the magnetic-pole position sensor 3 is normal has not been determined, the overmodulation control is performed in both of the vector control and the sensorless vector control. Meanwhile, when occurrence of a failure of the magnetic-pole position sensor 3 has been definitively determined, the sensorless vector control is executed. In this case, however, the overmodulation control, which may generate harmonic waves in the output voltage, is not performed.

Further, in this embodiment, the target value Mo of the first modulation ratio is set smaller than the maximum value Mmax of the modulation ratio. This setting allows the modulation ratio to have a margin for controlling the actual modulation ratio to a value close to the target value Mo of the modulation ratio.

When the failure-state signal FAIL_STAT is 1 that is indicative of the intermediate state, the failure-state signal FAIL_STAT may fluctuate between 1 and 0 that is indicative of definitively determined normality to cause hunting. Further, when the failure-state signal FAIL_STAT is 3 that is indicative of the intermediate state, the failure-state signal FAIL_STAT may fluctuate between 3 and 2 that is indicative of definitively determined faulty to cause hunting.

When the target value Mo of the modulation ratio and the maximum value Mmax of the modulation ratio are changed based simply on which of the vector control using sensor signals and the sensorless vector control is performed, the d-axis current command value, the q-axis current command value, and the voltage command values of three phases may also cause hunting, leading to torque shock. In the worst case, the estimation of the magnetic-pole position may diverge.

Hunting between the vector control and the sensorless vector control may also lead to torque shock. Meanwhile, in a case in which a control mode is switched to the sensorless vector control, hunting can be prevented, for example, by allowing the control mode to be switched back to the vector control only after elapse of a set time period.

The value of the failure-state signal FAIL_STAT changes in the order of 0, 1, 2, 3, and 0 regardless of occurrence of hunting. Thus, classifying the failure-state signals FAIL_STAT of 0 and 1 into one group and the failure-state signals FAIL_STAT of 2 and 3 into another group means that the target value Mo of the modulation ratio and the maximum value Mmax of the modulation ratio are not changed when the failure-state signal FAIL_STAT, which has indicated the normal state or the faulty state, changes to the value indicating the intermediate state.

Figure 5:
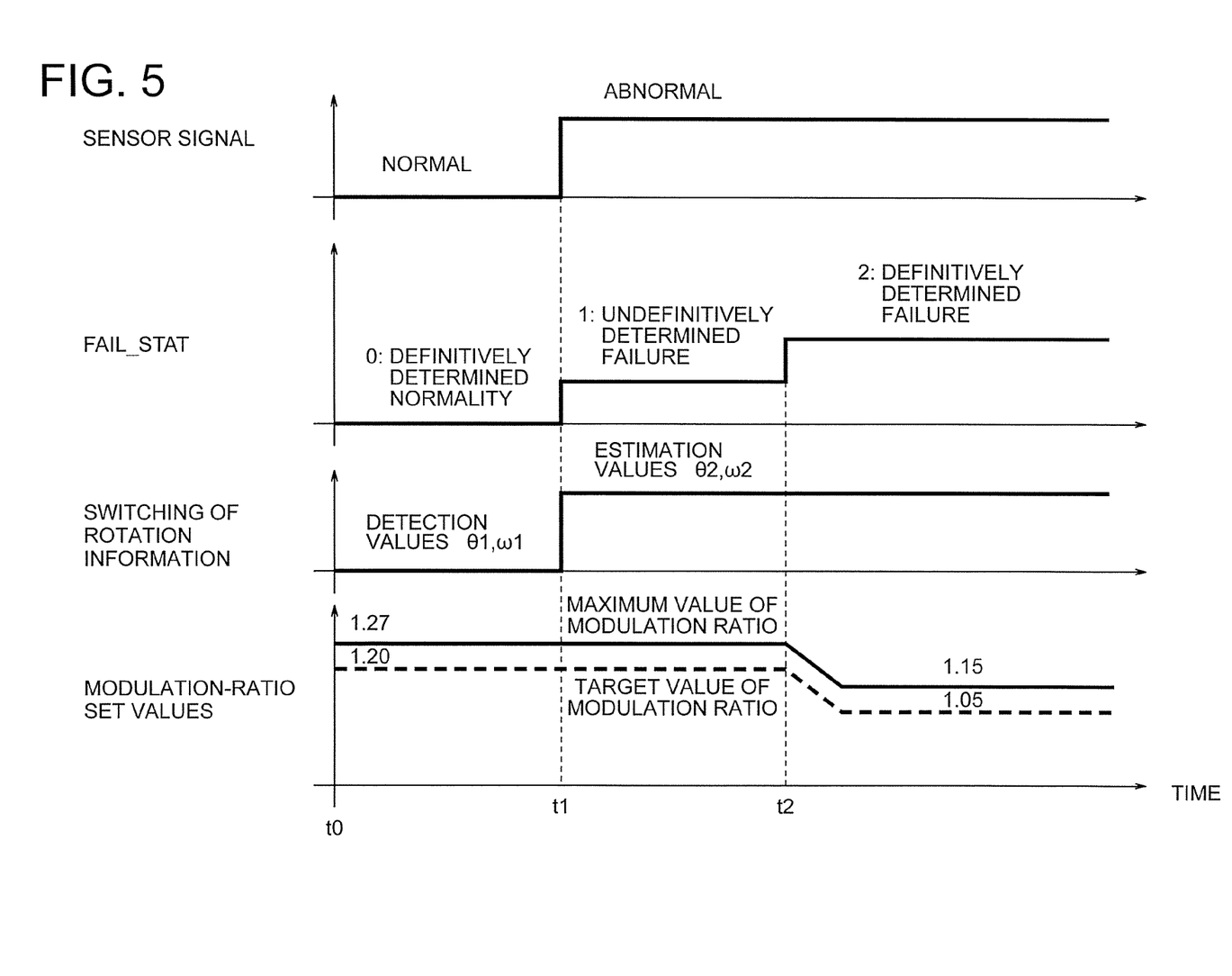
FIG. 5 is a timing chart for showing control behaviors of the controller when an output signal from a magnetic-pole position sensor, which has been initially normal, becomes abnormal.

Next, control behaviors of the controller 30 are described. FIG. 5 is a timing chart for showing control behaviors of the controller 30 when the output signal from the magnetic-pole position sensor 3, which has been initially normal, becomes abnormal.

At a time t0, it has been definitively determined that the magnetic-pole position sensor 3 is normal, and thus the failure-state signal FAIL_STAT is "0." Thus, the rotation detecting circuitry 36 selects the magnetic-pole position θ1 and the rotational angular velocity ω1, which have been detected by the magnetic-pole position detecting circuitry 36a, as the magnetic-pole position θ and the rotational angular velocity ω, respectively.

At this time, the maximum value Mmax of the modulation ratio is larger than the target value Mo of the modulation ratio. Further, the maximum value Mmax of the modulation ratio is 1.27 and the target value Mo of the modulation ratio is 1.20, both of which fall within the overmodulation control.

At a time t1, the output signal from the magnetic-pole position sensor 3 becomes abnormal due to, for example, wire disconnection. Then, the failure-state signal FAIL_STAT output from the failure-state determining circuitry 37 becomes "1." Thus, the rotation detecting circuitry 36 selects the magnetic-pole position θ2 and the rotational angular velocity ω2, which have been estimated by the magnetic-pole position estimating circuitry 36b, as the magnetic-pole position θ and the rotational angular velocity ω, respectively.

At this time, the maximum value Mmax of the modulation ratio and the target value Mo of the modulation ratio are not changed. The maximum value Mmax of the modulation ratio and the target value Mo of the modulation ratio are kept to the same values as those at the time t0.

After that, when the output signal from the magnetic-pole position sensor 3 is still abnormal and the abnormality count value counted by the failure determination counter reaches the failure definitive determination value at a time t2, it is definitively determined that a failure of the magnetic-pole position sensor 3 has occurred. Then, the failure-state signal FAIL_STAT becomes "2."

In response to the failure-state signal FAIL_STAT of "2," the modulation-ratio switching circuitry 38 sets the maximum value Mmax of the modulation ratio and the target value Mo of the modulation ratio smaller than the values used when the output signal from the magnetic-pole position sensor 3 is normal. Specifically, the maximum value Mmax of the modulation ratio is changed to 1.15, and the target value Mo of the modulation ratio is changed to 1.05, both of which are outside the overmodulation control.

In this embodiment, the modulation-ratio switching circuitry 38 gradually changes the target value Mo of the modulation ratio and the maximum value Mmax of the modulation ratio.

Figure 6:
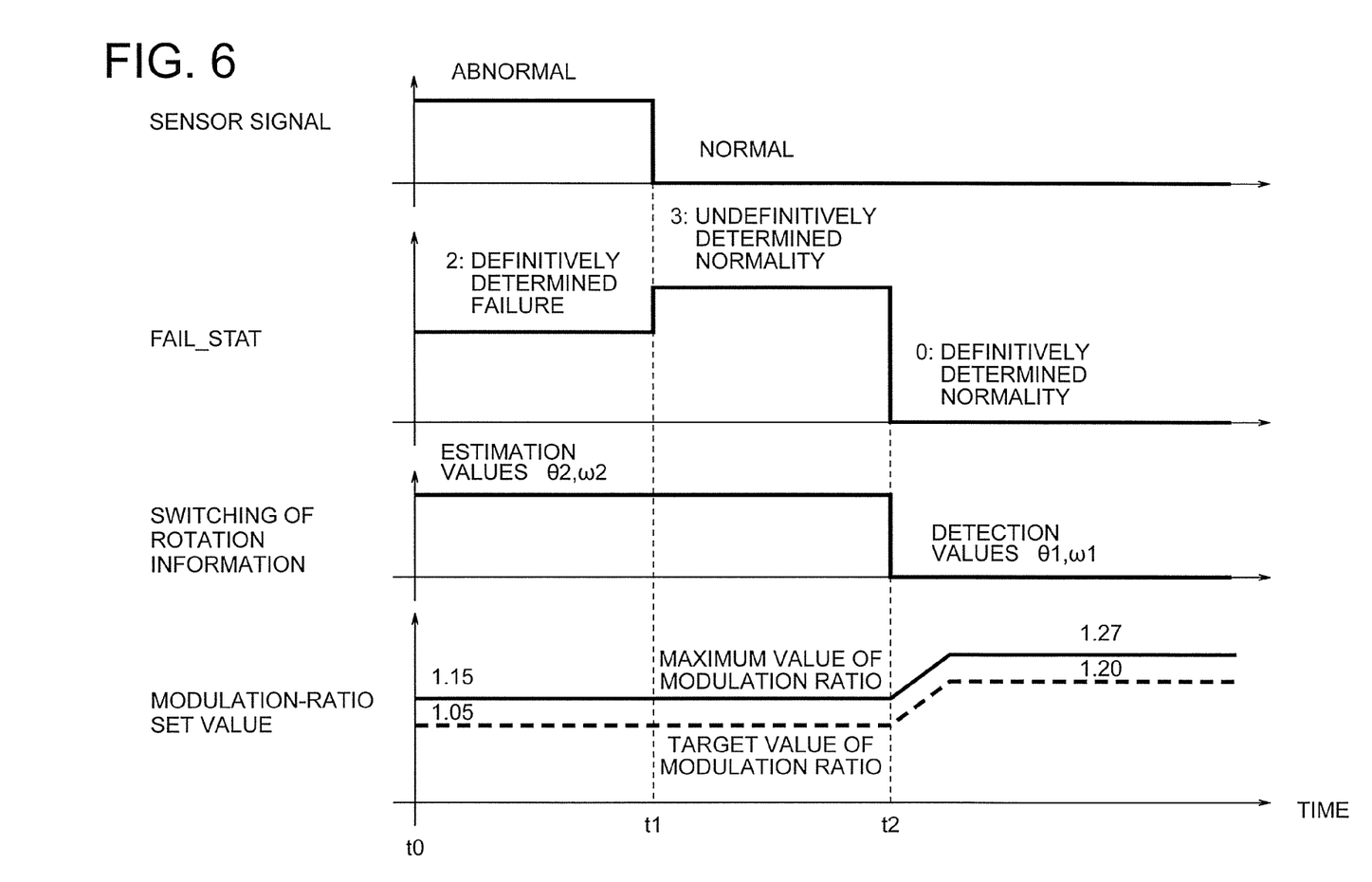
FIG. 6 is a timing chart for showing control behaviors of the controller when an output signal from the magnetic-pole position sensor, which has been initially abnormal, becomes normal.

Next, FIG. 5 is a timing chart for showing control behaviors of the controller 30 when the output signal from the magnetic-pole position sensor 3, which has been initially abnormal, becomes normal.

At a time t0, it has been definitively determined that a failure of the magnetic-pole position sensor 3 has occurred, and thus the failure-state signal FAIL_STAT is "2." Thus, the rotation detecting circuitry 36 selects the magnetic-pole position θ2 and the rotational angular velocity ω2, which have been detected by the magnetic-pole position estimating circuitry 36b, as the magnetic-pole position θ and the rotational angular velocity ω, respectively.

At this time, the maximum value Mmax of the modulation ratio is larger than the target value Mo of the modulation ratio. Further, the maximum value Mmax of the modulation ratio is 1.15 and the target value Mo of the modulation ratio is 1.05, both of which are outside the overmodulation control.

At a time t1, the output signal from the magnetic-pole position sensor 3 becomes abnormal due to, for example, resolution of wire disconnection. Then, the failure-state signal FAIL_STAT output from the failure-state determining circuitry 37 becomes "3." Thus, the rotation detecting circuitry 36 continuously selects the magnetic-pole position θ2 and the rotational angular velocity ω2, which have been estimated by the magnetic-pole position estimating circuitry 36b, as the magnetic-pole position θ and the rotational angular velocity ω, respectively.

At this time, the maximum value Mmax of the modulation ratio and the target value Mo of the modulation ratio are not changed. The maximum value Mmax of the modulation ratio and the target value Mo of the modulation ratio are kept to the same values as those at the time t0.

After that, when the output signal from the magnetic-pole position sensor 3 is still in the normal state, and the normality count value counted by the normality determination counter reaches the normality definitive determination value at a time t2, it is definitively determined that the magnetic-pole position sensor 3 is in the normal state. Then, the failure-state signal FAIL_STAT becomes "0." Thus, the rotation detecting circuitry 36 selects the magnetic-pole position θ1 and the rotational angular velocity ω1, which have been detected by the magnetic-pole position detecting circuitry 36*a*, as the magnetic-pole position $\theta$ and the rotational angular velocity $\omega$, respectively.

In response to the failure-state signal FAIL_STAT of "0," the modulation-ratio switching circuitry 38 sets the maximum value Mmax of the modulation ratio and the target value Mo of the modulation ratio larger than the values used when the output signal from the magnetic-pole position sensor 3 is abnormal. Specifically, the maximum value Mmax of the modulation ratio is changed to 1.27, and the target value Mo of the modulation ratio is changed to 1.20, both of which fall within the overmodulation control.

Further, in this embodiment, the target value Mo of the modulation ratio and the maximum value Mmax of the modulation ratio are gradually changed.

The target value Mo of the modulation ratio and the maximum value Mmax of the modulation ratio may be changed in a stepwise manner. The stepwise change is effective when harmonic waves have a large influence in the sensorless vector control and the modulation ratio is required to be quickly decreased.

The maximum value Mmax of the modulation ratio is changed while being kept larger than the target value Mo of the modulation ratio regardless of whether it is a gradual change or a stepwise change. As a result, a margin for the modulation ratio is ensured.

Figure 7:
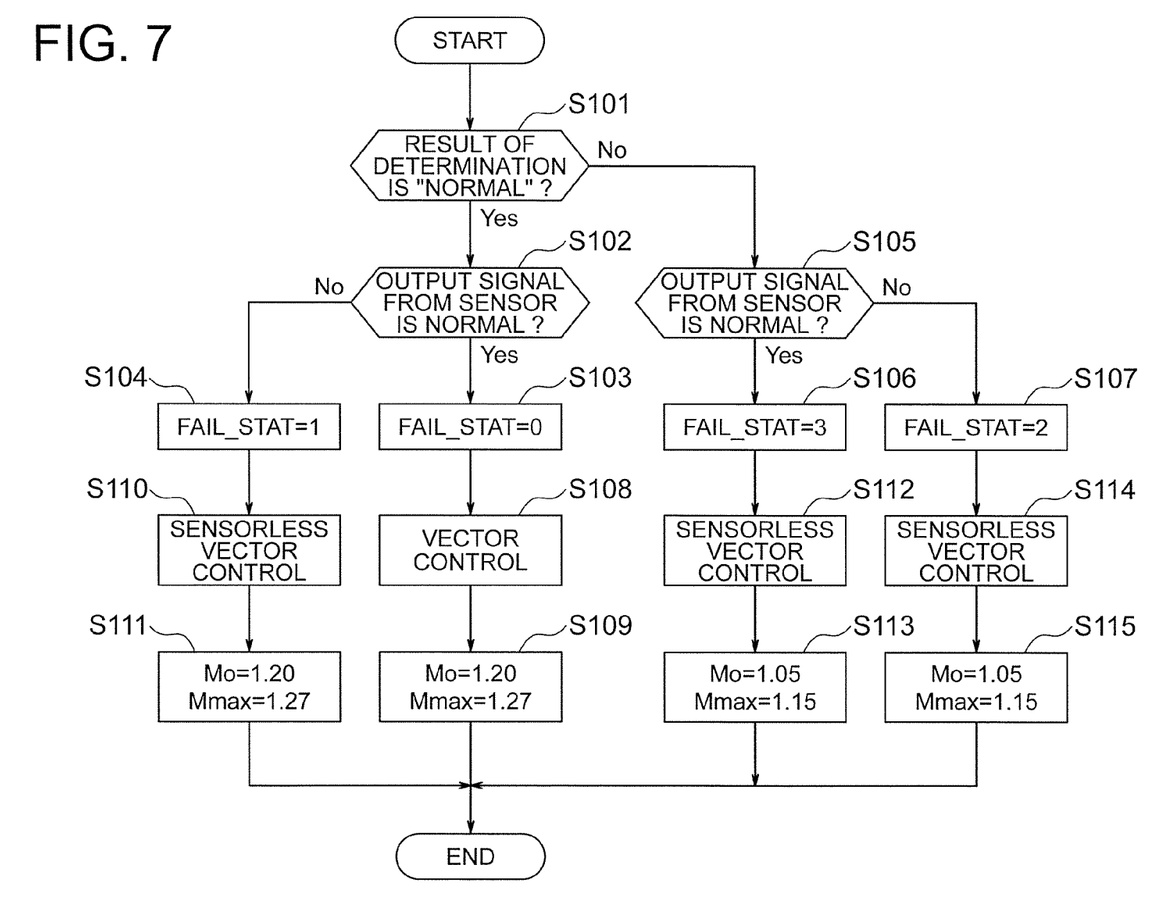
FIG. 7 is a flowchart for illustrating operations of a failure-state determining circuitry, a rotation-information switching circuitry, and a modulation-ratio switching circuitry illustrated in FIG. 2.

FIG. 7 is a flowchart for illustrating operations of the failure-state determining circuitry 37, the rotation-information switching circuitry 36*c*, and the modulation-ratio switching circuitry 38 illustrated in FIG. 2. The controller 30 repeatedly executes processing illustrated in FIG. 7. In FIG. 7, illustration of processing performed by the failure determination counter and the normal determination counter when the failure-state signal FAIL_STAT indicates the intermediate state is omitted.

In Step S101, the failure-state determining circuitry 37 checks whether it has been determined that the magnetic-pole position sensor 3 is normal. When it has been determined that the magnetic-pole position sensor 3 is normal, the failure-state determining circuitry 37 determines, in Step S102, whether the output signal from the magnetic-pole position sensor 3 is normal.

When the output signal from the magnetic-pole position sensor 3 is normal, the failure-state determining circuitry 37 outputs the failure-state signal FAIL_STAT of 0 in Step S103. When the output signal from the magnetic-pole position sensor 3 is not normal, the failure-state determining circuitry 37 outputs the failure-state signal FAIL_STAT of 1 in Step S104.

When it has been determined that a failure of the magnetic-pole position sensor 3 has occurred, the failure-state determining circuitry 37 determines, in Step S105, whether the output signal from the magnetic-pole position sensor 3 is normal.

When the output signal from the magnetic-pole position sensor 3 is normal, the failure-state determining circuitry 37 outputs the failure-state signal FAIL_STAT of 3 in Step S106. When the output signal from the magnetic-pole position sensor 3 is not normal, the failure-state determining circuitry 37 outputs the failure-state signal FAIL_STAT of 2 in Step S107.

After the failure-state signal FAIL_STAT of 0 is output in Step S103, the rotation-information switching circuitry 36*c* selects the vector control in Step S108. Specifically, the rotation-information switching circuitry 36*c* outputs the magnetic-pole position $\theta 1$ and the rotational angular velocity $\omega 1$, which have been detected based on the output signal from the magnetic-pole position sensor 3, as the magnetic-pole position $\theta$ and the rotational angular velocity $\omega$. Then, in Step S109, the modulation-ratio switching circuitry 38 sets the target value Mo of the modulation ratio to 1.20 and the maximum value Mmax of the modulation ratio to 1.27.

After the failure-state signal FAIL_STAT of 1 is output in Step S104, the rotation-information switching circuitry 36*c* selects the sensorless vector control in Step S110. Specifically, the rotation-information switching circuitry 36*c* outputs the magnetic-pole position $\theta 2$ and the rotational angular velocity $\omega 2$, which have been estimated by the magnetic-pole position estimating circuitry 36*b*, as the magnetic-pole position $\theta$ and the rotational angular velocity $\omega$. Then, in Step S111, the modulation-ratio switching circuitry 38 sets the target value Mo of the modulation ratio to 1.20 and the maximum value Mmax of the modulation ratio to 1.27.

After the failure-state signal FAIL_STAT of 3 is output in Step S106, the rotation-information switching circuitry 36*c* selects the sensorless vector control in Step S112. Specifically, the rotation-information switching circuitry 36*c* outputs the magnetic-pole position $\theta 2$ and the rotational angular velocity $\omega 2$, which have been estimated by the magnetic-pole position estimating circuitry 36*b*, as the magnetic-pole position $\theta$ and the rotational angular velocity $\omega$. Then, in Step S113, the modulation-ratio switching circuitry 38 sets the target value Mo of the modulation ratio to 1.05 and the maximum value Mmax of the modulation ratio to 1.15.

After the failure-state signal FAIL_STAT of 2 is output in Step S107, the rotation-information switching circuitry 36*c* selects the sensorless vector control in Step S114. Specifically, the rotation-information switching circuitry 36*c* outputs the magnetic-pole position $\theta 2$ and the rotational angular velocity $\omega 2$, which have been estimated by the magnetic-pole position estimating circuitry 36*b*, as the magnetic-pole position $\theta$ and the rotational angular velocity $\omega$. Then, in Step S115, the modulation-ratio switching circuitry 38 sets the target value Mo of the modulation ratio to 1.05 and the maximum value Mmax of the modulation ratio to 1.15.

The controller 30 that performs the processing described above calculates the d-axis current command value Ido and the q-axis current command value Iqo based on the target value Mo of the modulation ratio. Further, when it is determined that a failure of the magnetic-pole position sensor 3 has occurred and the sensorless vector control is performed, the target value Mo of the modulation ratio is set smaller than the value used when it is determined that the magnetic-pole position sensor 3 is normal and the vector control is performed.

Accordingly, the vector control improves a voltage utilization rate. Meanwhile, the sensorless vector control decreases harmonic components in the output voltage to prevent degradation of estimation performance, which may be caused by a harmonic component contained in a current. Through the control described above, when a failure of the magnetic-pole position sensor 3 occurs, a stable operation of the AC rotating electric machine 1 can be more reliably continued.

Further, when it is definitively determined that the magnetic-pole position sensor 3 is normal and the vector control is performed, the target value Mo of the modulation ratio is set to a value which falls within the overmodulation control. When it is definitively determined that a failure of the magnetic-pole position sensor 3 has occurred and the sensorless vector control is performed, the target value Mo of the modulation ratio is set to a value outside the overmodulation control.

Thus, the generation of harmonic components in the output voltage is prevented, enabling the operation of the AC rotating electric machine 1 to be more reliably continued with the sensorless vector control.

Further, the voltage command values Vuo, Vvo, and Vwo of three phases are limited based on the maximum value Mmax of the modulation ratio. Further, when it is determined that a failure of the magnetic-pole position sensor 3 has occurred and the sensorless vector control is performed, the maximum value Mmax of the modulation ratio is set smaller than the value used when it is determined that the magnetic-pole position sensor 3 is normal and the vector control is performed.

Thus, the value of the modulation ratio can be more reliably limited. As a result, the operation of the AC rotating electric machine 1 can be more reliably continued than in a case in which only the target value Mo of the modulation ratio is set to a smaller value.

The maximum value Mmax of the modulation ratio is set larger than the target value Mo of the modulation ratio. Thus, a margin for the modulation ratio is ensured, enabling control so that an actual current matches a sum of the d-axis current command value Ido and the q-axis current command value Iqo. As a result, the magnetic-pole position can be reliably estimated, enabling the operation of the AC rotating electric machine 1 to be more reliably continued with the sensorless vector control.

When the failure-state signal FAIL_STAT indicates the intermediate state between the normal state and the faulty state, the sensorless vector control is performed without changing the target value Mo of the modulation ratio from the previous value set when the failure-state signal FAIL_STATE indicates the normal state or the faulty state.

Thus, when there is a possibility that hunting may occur in the selected control mode, the target value Mo of the modulation ratio is not changed, preventing the d-axis current command value Ido and the q-axis current command value Iqo from fluctuating. Thus, the voltage command values Vuo, Vvo, and Vwo of three phases are also prevented from fluctuating. As a result, the magnetic-pole position is reliably estimated, enabling the operation of the AC rotating electric machine 1 to be more reliably continued with the sensorless vector control.

Further, when the failure-state signal indicates the intermediate state between the normal state and the faulty state, the sensorless vector control is performed, and the target value Mo of the modulation ratio and the maximum value Mmax of the modulation ratio are not changed from the previous values set when the failure-state signal indicates the normal state or the faulty state.

Thus, in a case in which hunting may occur in the selected control mode, the target value Mo and the maximum value Mmax of the modulation ratio are not changed, enabling a margin of the modulation ratio to be more reliably ensured. As a result, excessive limitation of the voltage command values Vuo, Vvo, and Vwo is prevented, enabling control so that the actual current matches the sum of the d-axis current command value Ido and the q-axis current command value Iqo. Thus, the magnetic-pole position is reliably estimated, enabling the operation of the AC rotating electric machine 1 to be more reliably continued with the senseless vector control.

The target value Mo of the modulation ratio is gradually changed. The gradual change in the target value Mo prevents sudden changes in the d-axis current command value Ido and the q-axis current command value Iqo in the sensorless vector control, preventing fluctuations in the voltage command values Vuo, Vvo, and Vwo. In this manner, the magnetic-pole position is reliably estimated, enabling the operation of the AC rotating electric machine 1 to be more reliably continued through the senseless vector control.

Further, the maximum value Mmax of the modulation ratio is gradually changed. The gradual change in the maximum value Mmax prevents the voltage command values Vuo, Vvo, and Vwo of three phases from being excessively limited, enabling control so that the actual current value matches the sum of the d-axis current command value Ido and the q-axis current command value Iqo. In this manner, the magnetic-pole position is reliably estimated, enabling the operation of the AC rotating electric machine 1 to be more reliably continued with the senseless vector control.

Figure 8:
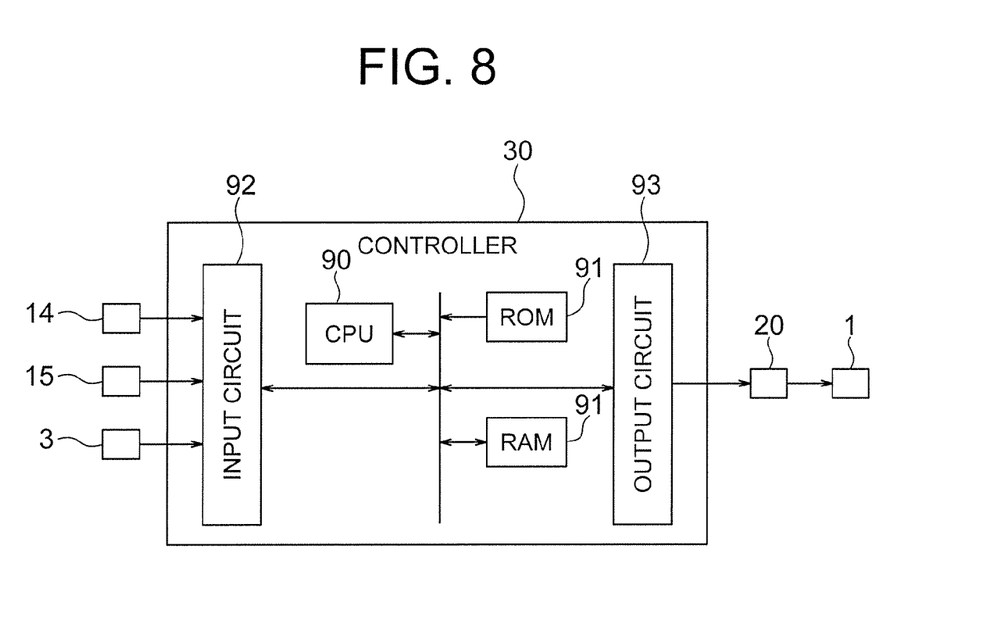
FIG. 8 is a configuration diagram for illustrating an example of a processing circuit that enables achievement of functions of the controller according to the first embodiment.

Functions of the controller 30 of the first embodiment are achieved by a processing circuit. FIG. 8 is a configuration diagram for illustrating an example of the processing circuit configured to achieve the functions of the controller 30 of the first embodiment.

The controller 30 includes a calculation processing device 90, a plurality of storage devices 91, an input circuit 92, and an output circuit 93.

As the calculation processing device 90, for example, a central processing unit (CPU) is used. The plurality of storage devices 91 are configured to transmit/receive data to/from the calculation processing device 90. The input circuit is configured to input signals from the outside to the calculation processing device 90. The output circuit 93 is configured to output signals from the calculation processing device 90 to the outside.

As the calculation processing device 90, for example, an application specific integrated circuit (ASIC), an integrated circuit (IC), a digital signal processor (DSP), a field programmable gate array (FPGA), various logic circuits, or various signal processing circuits may be used.

The controller 30 may include a plurality of calculation processing devices 90 of the same kind or different kinds. In this case, the processing performed by the controller 30 may be divided and assigned to the plurality of calculation processing devices 90.

For example, a random access memory (RAM) and a read only memory (ROM) are used as the plurality of storage devices 91. The RAM is configured to be able to read and write data from and to the calculation processing device 90, and the ROM is configured to be able to read data from the calculation processing device 90. At least one of the storage devices 91 stores software for achieving the functions of the controller 30, specifically, programs, and a plurality of pieces of setting data.

Signals output from a plurality of sensors and a plurality of switches are input to the input circuit 92. The plurality of sensors includes the power supply voltage sensor 14, the magnetic-pole position sensor 3, and the current sensors 15. Further, the input circuit 92 includes an A/D converter (not shown).

The output circuit 93 includes a drive circuit (not shown). An electric load is connected to the drive circuit. The electric load is, for example, a gate drive circuit. The gate drive circuit is configured to turn on and off the plurality of switching elements of the inverter 20. The drive circuit outputs a control signal from the calculation processing device 90 to the electric load.

The functions of the controller 30 illustrated in FIG. 2 are achieved through the execution of a program by the calculation processing device 90 to allow the calculation processing device 90 to cooperate with other hardware, specifically, the storage devices 91, the input circuit 92, and the output circuit 93.

A purpose of use of the AC rotating electric machine 1 is not limited to a particular one.

For example, the AC rotating electric machine 1 is suitably used as a driving-force source for a wheel of a vehicle. In this case, when the magnetic-pole position sensor 3 is normal, the overmodulation control is performed to improve a voltage utilization rate to reduce a loss. In this manner, fuel efficiency, that is, electricity efficiency can be improved. Further, when a failure of the magnetic-pole position sensor 3 occurs, the operation of the AC rotating electric machine 1 can be more reliably continued with the sensorless vector control. Thus, after occurrence of a failure of the magnetic-pole position sensor 3, an operation of the vehicle can be continued, reducing an influence on a driver. Further, when the failure-state signal indicates the intermediate state regarding the magnetic-pole position sensor 3, the sensorless vector control is performed without changing the target value Mo of the modulation ratio and the maximum value Mmax of the modulation ratio from the previous values set when the failure-state signal indicates the normal state or the faulty state. Thus, fluctuations in the d-axis current command value Ido and the q-axis current command Iqo are suppressed, preventing degradation of drivability.

Further, the AC rotating electric machine 1 is not limited to a permanent-magnet synchronous rotating electric machine. For example, any field-winding AC rotating electric machine or induction machine that can be subjected to the vector control and the sensorless vector control can be used as the AC rotating electric machine 1.

The number of phases of the plurality of windings included in the AC rotating electric machine 1 is not limited to three, and may be, for example, two or four.

In the embodiment described above, one set of the windings of three phases and one inverter 20 are used. However, two or more sets, each including windings of a plurality of phases, and two or more inverters may be used. In this case, similar control as that described in the embodiment is performed for each of the inverters and a corresponding set of the windings.

In the embodiment described above, the current command value calculating circuitry 33 changes the interlinkage magnetic flux command value ψo, which is used as an intermediate parameter, based on the target value Mo of the modulation ratio, and sets the d-axis current command value Ido and the q-axis current command value Iqo based on the interlinkage magnetic flux command value ψo. However, the current command value calculating circuitry 33 may set the d-axis current command value Ido and the q-axis current command value Iqo without using the interlinkage magnetic flux command value ψo. For example, the current command value calculating circuitry 33 may use an undervoltage ratio as an intermediate parameter. In this case, the current command value calculating circuitry 33 changes the undervoltage ratio based on the target value Mo of the modulation ratio, and sets the d-axis current command value Ido and the q-axis current command value Iqo based on the undervoltage ratio.

Further, the current command value calculating circuitry 33 may set the d-axis current command value Ido and the q-axis current command value Iqo, which are commonly used in this embodiment, by using various publicly known current vector control. For example, the current command value calculating circuitry 33 may set the d-axis current command value Ido and the q-axis current command value Iqo based on values including the torque command value To, the rotational angular velocity ω, and the power supply voltage VDC through maximum torque current control or flux weakening control.

Still further, in the embodiment described above, the target value Mo of the modulation ratio and the maximum value Mmax of the modulation ratio are set to fixed values in each of the vector control and the sensorless vector control. However, the target value Mo of the modulation ratio and the maximum value Mmax of the modulation ratio may be changed based on, for example, whether resonance may occur. Further, the target value Mo of the modulation ratio and the maximum value Mmax of the modulation ratio may be changed based on operating states, for example, the power supply voltage VDC, the torque command value To, and the rotational angular velocity ω. Changing the target value Mo of the modulation ratio and the maximum value Mmax of the modulation ratio more suitably suppresses occurrence of resonance. Also in this case, the maximum value Mmax of the modulation ratio is set larger than the target value Mo of the modulation ratio.

Still further, in the embodiment described above, as a desirable mode, both of the target value Mo of the modulation ratio and the maximum value Mmax of the modulation ratio are changed. However, only the target value Mo of the modulation ratio may be changed. Also in this case, the effect of reducing average harmonic components is obtained to enable the operation of the AC rotating electric machine to be more reliably continued with the sensorless vector control. Similarly, when only the maximum value Mmax of the modulation ratio is changed, the effect of reducing an upper limit value of generated harmonic components is obtained to enable the operation of the AC rotating electric machine to be more reliably continued with the sensorless vector control.

Various features, modes, and functions described in the embodiment can be used solely or in combination in embodiments. Therefore, it is envisioned that an unlimited number of modification examples not exemplified here are within the scope of the present disclosure. For example, at least one constituent element may be modified, added, or omitted.

What is claimed is:

1. A controller for an AC rotating electric machine, the controller comprising:
   a magnetic-pole position detecting circuitry configured to detect a magnetic-pole position of a rotor based on an electric signal to be output in accordance with a rotation angle of the rotor;
   a magnetic-pole position estimating circuitry configured to estimate the magnetic-pole position of the rotor independently of the output signal from the magnetic-pole position sensor;
   a failure-state determining circuitry configured to determine a failure state of the magnetic-pole position sensor based on the output signal from the magnetic-pole position sensor;
   a rotation-information switching circuitry configured to output, when the magnetic-pole position sensor is normal, a magnetic-pole position detected by the magnetic-pole position detecting circuitry, and to output, when the magnetic-pole position sensor is abnormal, a magnetic-pole position estimated by the magnetic-pole position estimating circuitry, based on the output signal from the failure-state determining circuitry:
   a modulation-ratio switching circuitry configured to output a target value of a modulation ratio, and to change the target value to be output based on a result of determination by the failure-state determining circuitry;

a current command value calculating circuitry configured to calculate a current command value based on the target value;

a voltage command value calculating circuitry configured to calculate a voltage command value based on the current command value and the magnetic-pole position output from the rotation-information switching circuitry; and a switching control circuitry configured to turn on and off a plurality of switching elements formed in an inverter based on the voltage command value, wherein the modulation-ratio switching circuitry is configured to set, when the magnetic-pole position sensor is determined as being abnormal by the failure-state determining circuitry, the target value to be smaller than in a case in which the magnetic-pole sensor is determined as being normal by the failure-state determining circuitry.

2. The controller for an AC rotating electric machine according to claim 1, wherein the failure-state determining circuitry is configured to output a failure-state signal indicating that the magnetic-pole position sensor is in one of a normal state, a faulty state, or an intermediate state being undetermined as any one of the normal state or the faulty state as the result of the determination of the failure state of the magnetic-pole position sensor, wherein, when the failure-state signal indicates the intermediate state, the rotation-information switching circuitry is configured to output the magnetic-pole position estimated by the magnetic-pole position estimating circuitry, and wherein, when the failure-state signal indicates the intermediate state, the modulation-ratio switching circuitry is configured to not to change the set target value.

3. The controller for an AC rotating electric machine according to claim 1, wherein the modulation-ratio switching circuitry is configured to gradually change the target value.

4. The controller for an AC rotating electric machine according to claim 1, wherein the modulation-ratio switching circuitry is configured to set, when the magnetic-pole position sensor is detected as being normal by the failure-state determining circuitry, the target value to a value which falls within overmodulation control, and to set, when the magnetic-pole position sensor is detected as being abnormal by the failure-state determining circuitry, the target value to a value outside the overmodulation control.

5. The controller for an AC rotating electric machine according to claim 4, wherein the failure-state determining circuitry is configured to output a failure-state signal indicating that the magnetic-pole position sensor is in one of a normal state, a faulty state, or an intermediate state being undetermined as any one of the normal state or the faulty state as the result of the determination of the failure state of the magnetic-pole position sensor, wherein, when the failure-state signal indicates the intermediate state, the rotation-information switching circuitry is configured to output the magnetic-pole position estimated by the magnetic-pole position estimating circuitry, and wherein, when the failure-state signal indicates the intermediate state, the modulation-ratio switching circuitry is configured to not to change the set target value.

6. The controller for an AC rotating electric machine according to claim 4, wherein the modulation-ratio switching circuitry is configured to gradually change the target value.

7. The controller for an AC rotating electric machine according to claim 1, wherein the modulation-ratio switching circuitry is configured to output a maximum value of the modulation ratio and also change the maximum value to be output, based on the result detected by the failure-state determining circuitry, wherein the voltage command value calculating circuitry is configured to limit the voltage command values based on the maximum value, and wherein the modulation-ratio switching circuitry is configured to set, when the magnetic-pole position sensor is determined as being abnormal by the failure-state determining circuitry, the target value to be smaller than in a case in which the magnetic-pole sensor is determined as being normal by the failure-state determining circuitry.

8. The controller for an AC rotating electric machine according to claim 7, wherein the modulation-ratio switching circuitry is configured to set the maximum value and the target value so that the maximum value is larger than the target value.

9. The controller for an AC rotating electric machine according to claim 7, wherein the failure-state determining circuitry is configured to output a failure-state signal indicating that the magnetic-pole position sensor is in one of a normal state, a faulty state, or an intermediate state being undetermined as any one of the normal state or the faulty state as the result of the determination of the failure state of the magnetic-pole position sensor, wherein, when the failure-state signal indicates the intermediate state, the rotation-information switching circuitry is configured to output the magnetic-pole position estimated by the magnetic-pole position estimating circuitry, and wherein, when the failure-state signal indicates the intermediate state, the modulation-ratio switching circuitry is configured to not to change the target value and the maximum value.

10. The controller for an AC rotating electric machine according to claim 7, wherein the modulation-ratio switching circuitry is configured to gradually change the maximum value.

11. The controller for an AC rotating electric machine according to claim 4, wherein the modulation-ratio switching circuitry is configured to output a maximum value of the modulation ratio and also change the maximum value to be output, based on the result detected by the failure-state determining circuitry, wherein the voltage command value calculating circuitry is configured to limit the voltage command values based on the maximum value, and wherein the modulation-ratio switching circuitry is configured to set, when the magnetic-pole position sensor is determined as being abnormal by the failure-state determining circuitry, the target value to be smaller than in a case in which the magnetic-pole sensor is determined as being normal by the failure-state determining circuitry.

12. The controller for an AC rotating electric machine according to claim 11, wherein the modulation-ratio switching circuitry is configured to set the maximum value and the target value so that the maximum value is larger than the target value.

13. The controller for an AC rotating electric machine according to claim 11,
wherein the failure-state determining circuitry is configured to output a failure-state signal indicating that the magnetic-pole position sensor is in one of a normal state, a faulty state, or an intermediate state being undetermined as any one of the normal state or the faulty state as the result of the determination of the failure state of the magnetic-pole position sensor,
wherein, when the failure-state signal indicates the intermediate state, the rotation-information switching circuitry is configured to output the magnetic-pole position estimated by the magnetic-pole position estimating circuitry, and
wherein, when the failure-state signal indicates the intermediate state, the modulation-ratio switching circuitry is configured to not to change the target value and the maximum value.

14. The controller for an AC rotating electric machine according to claim 11, wherein the modulation-ratio switching circuitry is configured to gradually change the maximum value.

* * * * *